United States Patent [19]

Harley

[11] Patent Number: 5,096,324

[45] Date of Patent: Mar. 17, 1992

[54] SECURING DEVICE

[75] Inventor: David N. Harley, Dorset, England

[73] Assignee: Titus Tool Company Limited, Buckinghamshire, England

[21] Appl. No.: 538,318

[22] Filed: Jun. 14, 1990

Related U.S. Application Data

[63] Continuation-in-part of Ser. No. 447,474, Dec. 7, 1989, Pat. No. 4,984,926.

[51] Int. Cl.⁵ .............................................. B25G 3/00
[52] U.S. Cl. ...................................... 403/8; 403/231; 403/407.1; 411/104; 411/108
[58] Field of Search ................... 403/7, 8, 231, 407.1, 403/409.1; 411/104–105, 107–108, 112–113, 174, 175

[56] References Cited

U.S. PATENT DOCUMENTS

| | | | |
|---|---|---|---|
| 4,060,949 | 12/1977 | Busse | 403/231 X |
| 4,089,614 | 5/1978 | Harley | 403/231 X |
| 4,575,275 | 3/1986 | Sterte | 403/7 |
| 4,810,127 | 3/1989 | Hettich | 403/407.1 |
| 4,826,345 | 5/1989 | Salice | 403/231 |
| 4,957,386 | 9/1990 | Harley et al. | 403/407.1 X |
| 4,984,926 | 1/1991 | Harley | 403/8 |

FOREIGN PATENT DOCUMENTS

| | | |
|---|---|---|
| 0112030 | 9/1983 | European Pat. Off. . |
| 96422 | 5/1957 | Fed. Rep. of Germany . |
| 352941 | 5/1977 | Fed. Rep. of Germany . |

OTHER PUBLICATIONS

Excerpt of Catalog Published by Assignee "KD System 4".

Primary Examiner—Andrew V. Kundrat
Attorney, Agent, or Firm—Lowe, Price, LeBlanc & Becker

[57] ABSTRACT

A device for securing furniture panels at right angles to each other includes a holding member including a plug portion which is positioned in a recess in a major surface of the first panel. The plug has a front wall which is exposed at one edge of the panel and positioned substantially flush with the panel edge. A chamber extends perpendicular to the edge of the panel through the full length of the plug from a first opening in the front wall to a second opening opposite the front wall. The chamber retains a screw within the body of the plug. A top wall of the plug is exposed at the major surface of the panel and has an opening extending into the body portion of the plug to enable tightening of a screw to engage a second, substantially perpendicular, second panel and draw the second panel toward the edge of the first panel. The screw can be inserted either through the top opening or through an opening opposite the front wall of the plug prior to insertion of the plug into the panel recess. The lower surface of the chamber is formed to guide the screw into proper alignment to engage the second panel.

11 Claims, 4 Drawing Sheets

SECURING DEVICE

This application is a continuation-in-part of application Ser. No. 447,474 filed Dec. 7, 1989, now U.S. Pat. No. 4,984,926.

This invention relates to devices for securing furniture panels.

In particular it relates to the type of devices which are used to secure two panels at right angles to one another, the edge of one panel being in contact with a major surface of the other panel.

A first known device of this type comprises a body portion made of a plastics material which has a bottom surface, and surrounding wall portions substantially perpendicular thereto. The top of the body portion has a generally open structure enabling a securing member in the form of a screw to be inserted in the body portion substantially parallel to the bottom thereof. The body portion is adapted to be fitted in a recess in a major surface of one of the panels to be joined. A front wall portion of the body portion is positioned substantially flush with an edge of the panel, and is adapted to allow the screw to be driven through it to engage the second panel, whilst retaining the screw head within the body portion of the securing device. When the joint is tightened the two panels are drawn together. The device may be provided with a separate cap adapted to cover its open top after insertion and driving of the screw.

Such prior art devices are weak. Although they are adequate for fixing non-structural panel members of an item of furniture in place, for example shelves, they do not provide a strong enough joint to be used for fixing together major structural components of assembly furniture.

Another prior art device of the same general type has a plug-like body portion which also has a top and a bottom wall connected by surrounding walls which include a front wall. The top wall has a recess in it extending almost the entire length of the body portion from the front wall towards the rear. At the front end wall of the device, which fits flush against the edge of a panel, the recess is deep enough to accommodate the head of a screw. This end wall has a generally U-shaped opening in it which is open at the top surface of the device and has a constriction slightly narrower than the diameter of the shank of the screw. The other end of the recess slopes upwardly towards the rear of the device giving access for a screwdriver. The device is intended for use in fixing shelves and the like. The plug-like body portion is positioned in a recess in the first panel or shelf, whilst the screw is driven into the other panel to a predetermined depth. The first panel or shelf is positioned with the recess of the fixing device over the protruding screw head and, once they are aligned, it is pushed down so that the screw head is received in the recess, snap-fitting into the U-shaped opening in the front end wall. The screw can then be tightened using a screwdriver at an angle to the screw axis by virtue of the sloping portion of the recess.

At the bottom of the U-shaped opening there is a step down to the floor of the recess which prevents a screw being easily inserted via the sloping surface because it cannot readily slide into position in the U-shaped opening.

A third prior art device of the same general type has a plug-like body portion which has both a top and a bottom wall which are connected by surrounding walls. The body portion of this securing device is also adapted to be fitted in a recess in a major surface of a panel, with a front wall positioned flush with an edge of the panel.

This type of device is stronger than those described above, but has the disadvantage that insertion of the screw is more complicated. The body portion of the device is provided with a hinging capability allowing a screw to be inserted when it is open, and arranged to be snapped shut with the screw in position before insertion in the recess in the panel surface. An opening is provided in the top wall of the body portion through which the tip of a screwdriver can be inserted at an angle to the screw axis to drive the screw.

A suitable screw for use in this and the previously described prior art devices, is one which is adapted to be driven at an angle to its axis. An example of this type of screw is described in European Patent No. 0 112 030. The need to drive the screw at an angle to its axis arises because it is preferable for the screw to be parallel to the plane of one panel and perpendicular to the plane of the other to form a strong joint. In achieving this arrangement there is no access to drive the head of the screw from a direction coincident with the screw axis, in the normal way.

The third type of prior art device described above is inherently strong, but has the disadvantage of being relatively complicated, and therefore costly, to make. The unit cost can be reduced by the use of cheaper types of screws, but this gives rise to further problems as cheaper screws have a greater tendency to break whilst being tightened during assembly of furniture, or if the panels are subjected to forces tending to move them laterally with respect to each other. A broken screw could only be removed, and a new one inserted, by taking out the whole of the securing device. This almost inevitably leads to damage of the panel in which the device has been positioned, and usually results in damage to the walls of the recess so that it is no longer capable of anchoring a replacement securing device. The panel thus becomes unusable.

The invention aims to overcome, at least in part, some of the disadvantages of the prior art outlined above.

According to one aspect of the invention there is provided a securing device for securing first and second panels at right angles to each other, comprising a holding member adapted to be fitted in a recess provided in a major surface of the first panel, said holding member comprising a plug-like body portion having a front wall exposed at an edge of said first panel and positioned substantially flush therewith, said front wall having a first opening therein extending substantially perpendicular to the front wall to define a chamber in the body portion, said chamber being adapted to accommodate a securing member having a longitudinal axis within the body portion, wherein the securing member is of a type adapted to be driven by a driving member positioned at an angle to the securing member axis, the holding member also being provided with a top wall exposed at a major surface of the panel and having a second opening therein at a relatively rearward position spaced from the front wall of the body portion by a portion of said top wall, said second opening in the top wall extending into the body portion, and connecting with said chamber for insertion of the securing member therethrough into the chamber, the chamber having a smoothly contoured lower surface substantially free from obstruction for permitting unobstructed movement of the inserted securing member to a position substantially perpendicular to the second panel with its leading end protruding through said first opening in the front wall, the top wall opening also providing access for driving the securing member to engage the second panel and draw it towards the first.

A securing device in accordance with the invention enables a securing member in the form of a screw to be inserted or removed whilst the body portion remains in position in the recess in the panel surface, and also provides an inherently strong joint.

In order that the invention may be more clearly understood embodiments thereof will be described with reference to the accompanying drawings, in which.

Figure 1:
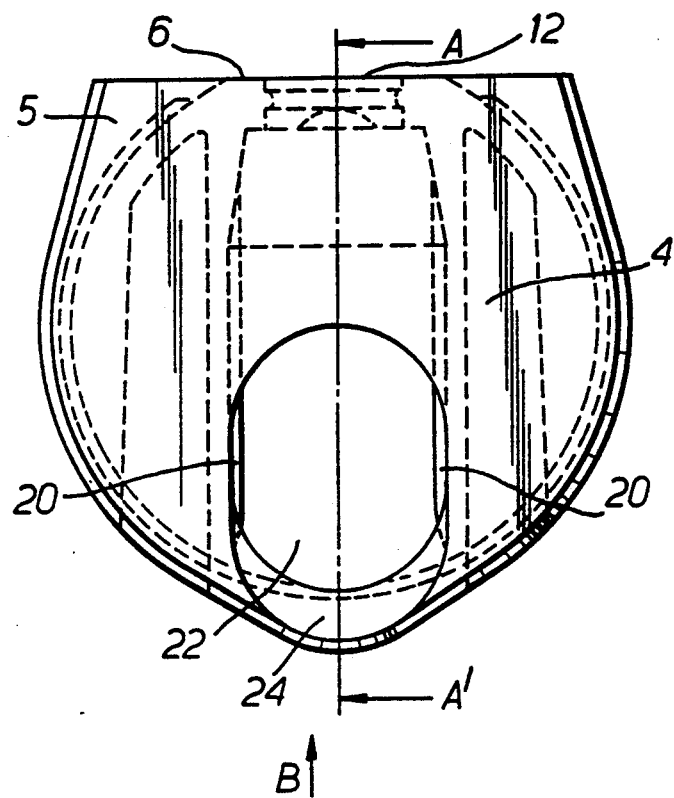
FIG. 1 is a plan view of a first securing device according to the invention.
Figure 4:
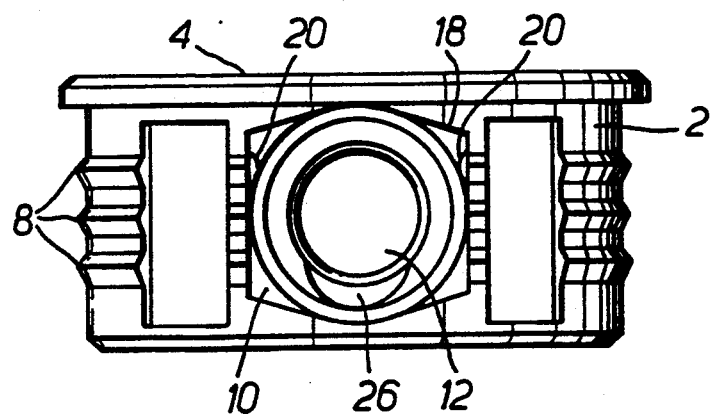
FIG. 4 is an end view of the securing device of FIG. 1, looking in the direction of arrow B.
Figure 2:
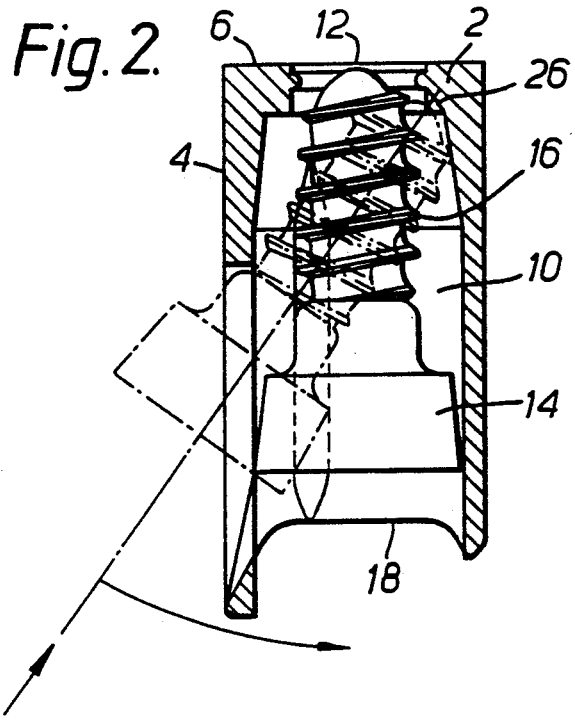
FIG. 2 is a sectional view taken along the line A—A' in FIG. 1 and showing a screw in position in the device, and in a position for insertion.
Figure 3:
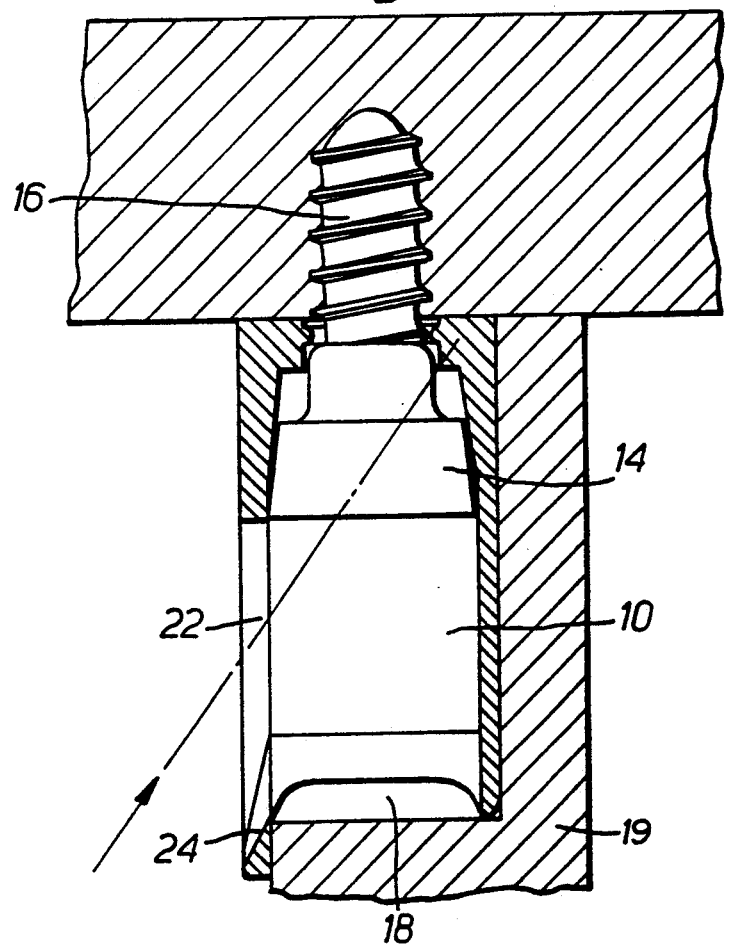
FIG. 3 is a sectional view also taken along the line A—A' in FIG. 1 but showing the two panels which are joined, the screw being in its driven position.
Figure 5:
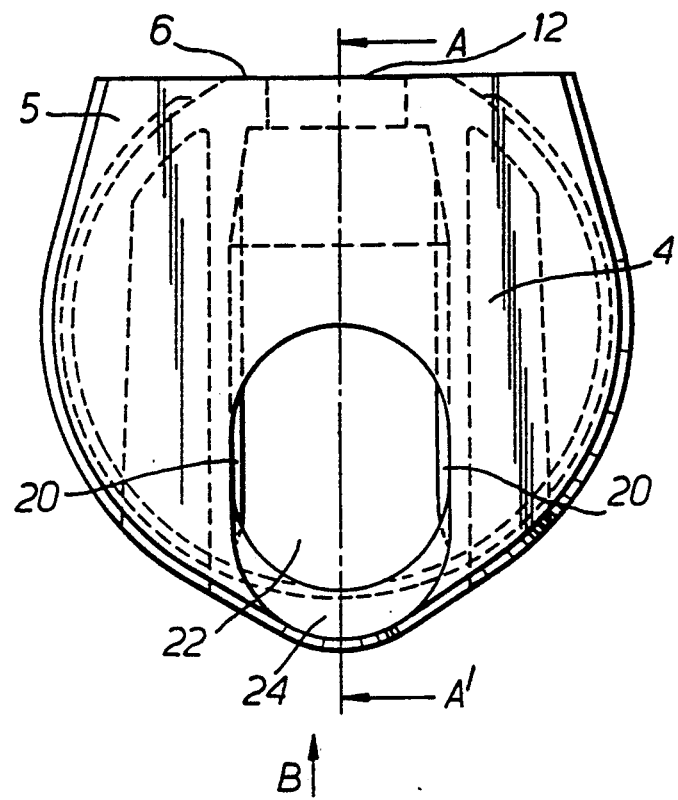
FIG. 5 is a plan view of an alternative securing device according to the invention.

The securing device of the first preferred embodiment shown in FIGS. 1 to 4 consists of a plug-like body portion 2 made of a suitable plastics material and having a top wall 4 which projects slightly beyond the side walls of the plug-like body in the form of a flange 5. This flange is more pronounced towards the front edge of the top wall 4. It serves to locate the body portion 2 at a suitable depth in a recess formed in the surface of a panel, and provides a neat finish by covering the edges of the recess when the body portion is in position.

One of the walls of the body portion 2 is flat and forms a front wall 6 which is fitted flush with an edge of the panel 19 in which the securing device is positioned. The other wall is generally arcuate, so that the plug has an overall cylindrical shape. The outer surface of the arcuate wall is provided with a series of circumferential ribs 8 which serve to anchor the body-portion 2 securely in the recess into which it is inserted.

The plug-like body portion 2 of the securing device is substantially hollow and has a chamber 10 within it defined by an opening 12 in the front wall 6 which extends axially into the body portion 2 and substantially perpendicular to the front wall 6. The bore of the chamber 10 is larger than the diameter of the opening 12 so that the head 14 of a screw 16 within the chamber 10 is retained inside the body portion 2, when the screw 16 is driven along the chamber axis.

In the embodiment shown in FIGS. 1 to 4 the chamber 10 extends across the full diameter of the body portion 2 from front to back of the device and forms an opening 18 in a portion of the arcuate wall opposite the front wall 6. This opening enables the screw 16 to be readily dropped into the chamber 10 during the production process of the securing device. Longitudinal ribs 20 are provided on the inner side walls of the chamber 10, towards the top of the body portion 2. These serve to locate and retain the screw 16 in position in the chamber 10 when the securing device is in transit.

An opening 22 is provided in the top wall 4 of the body portion 2, which connects with the chamber 10 so that a screw 16 can be inserted into the chamber 10 through the top wall 4 of the body portion 2. To make this insertion easier the rear edge of the opening 22 has a chamfer 24 providing more room for the screw to move into the chamber 10, and also enabling a screwdriver to be more easily positioned correctly for driving the screw through the chamber 10. A portion 26 of the wall of the chamber 10 adjacent the opening 12 in the front wall 6 of the body portion 2, and in line with the axis of the screw 16 when it is inserted through the top wall 4, is also chamfered to give room to allow the screw 16 to pivot into the chamber 10 to a position in which its axis lies along the axis of the chamber 10.

The provision of the opening 22 in the top wall 4 firstly allows access for driving the screw with a screwdriver placed at an angle to the screw axis, and secondly enables screws to be inserted and removed when the body portion 2 is in position in the recess of the panel surface. Thus broken or otherwise damaged screws can be removed and replaced without the possibility of damage being caused to the panel.

Turning now to FIGS. 5 to 8 a second embodiment of the securing device will be described.

This device also consists of a plug-like body portion 2 with a top wall 4 extending beyond the side walls of the body portion 2 to form a flange 5, and has generally the same configuration as the securing device already described. However, as can best be seen in FIG. 8 the opening 12 in the front wall 6 of the body portion 2 is elongate and may be generally oval or D-shaped, extending in a direction from top to bottom of the plug-like body portion 2. As can be seen the top and bottom ends of the opening 12 are generally curved in the embodiment shown, and the upper end is semi-circular, centred on a point generally central in the front wall 6, so that the opening 12 as a whole is offset from a central position in the front wall 6 in a direction perpendicular to a top wall 4. This positioning helps to locate the screw 16 when the joint is fastened, as will be explained below.

As in the previously described embodiment the bore of the chamber 10 is larger than the opening 12, so that the chamber 10 can accommodate the head 14 of the screw 16 but the opening 12 cannot, so that the screw head 14 is retained inside the body portion when the screw 16 is driven As before, the chamber 10 is arranged to extend through the full length of the body portion 2 forming an opening 18 in a portion of the arcuate wall opposite the front wall 6.

The body portion 2 of the securing device shown in FIGS. 5 to 8 is provided with an oval opening 22 in its top wall which is positioned towards the rear of the body portion 2. The opening 22 has a chamfer 24 on its rear edge to provide additional room for insertion of the screw 16 into the chamber 10 through the opening 22. The portion of the top wall between the edge of the oval opening 22 closest to the front wall of the plug-like body portion 2 and that front wall is at least 1/5 and preferably ¼ to ⅓ of the overall length of the top of the device. It is therefore substantial enough to provide at least the portion of the device nearer the front wall with sufficient rigidity to resist compressive forces.

The lower surface 28 of the chamber 10 is contoured to slope gently up towards the lower edge of the elongate opening 12 in the front wall 6 with no obstructions. This allows the tip of the screw 16 to slide along the bottom of the chamber 10 and pivot into the opening 12 as the screw 16 takes up its position in line with the chamber axis. The tip of the screw 16 will move into the lower part of the opening 12 and as the joint is tightened the screw 16 will locate in the upper, semicircular part of the opening 12 so that it takes up a central position relative to the front wall 6.

As can be seen in the Figures, the passageway formed by the opening 22 in the top wall and the chamber 10 is generally L-shaped and is dimensioned to allow the screw 16 to be guided through a generally arcuate path from insertion in the top of the device to its position in the chamber 10 ready to be driven.

Figure 8:
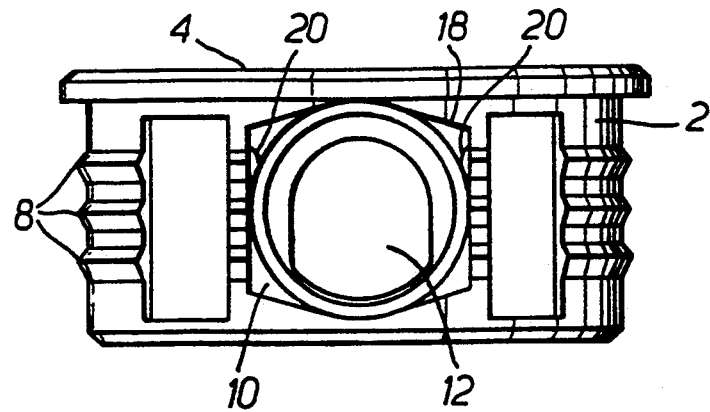
FIG. 8 is an end view of the securing device of FIG. 5, looking in the direction of arrow B.
Figure 6:
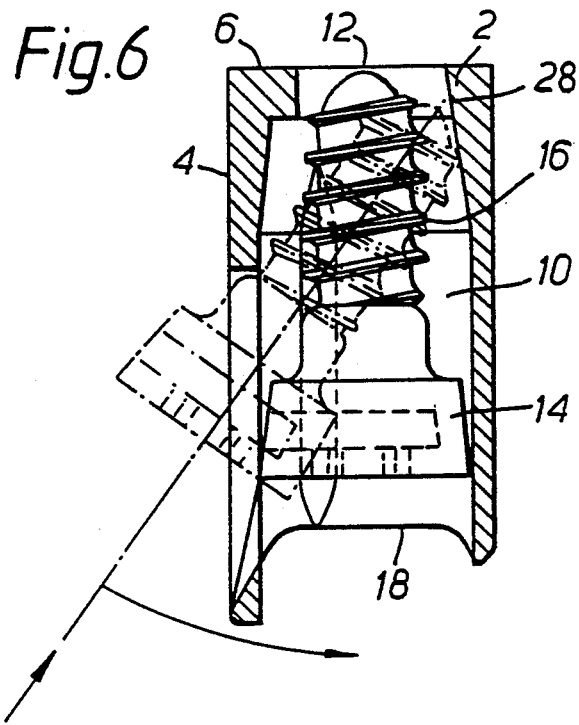
FIG. 6 is a sectional view taken along the line A—A' in FIG. 5 and showing a screw in position in the device, and in a position for insertion.
Figure 7:
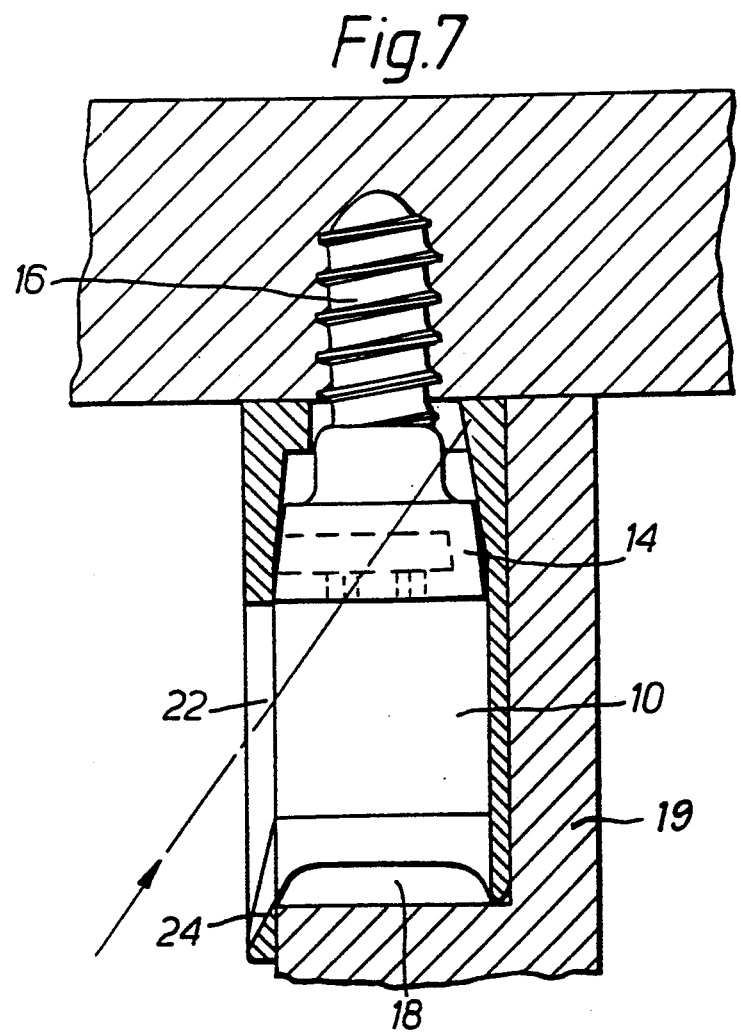
FIG. 7 is a sectional view also taken along the line A—A' in FIG. 5 but showing the two panels which are joined, the screw being in its driven position.

The securing device of the invention, as previously explained, is intended for use with screws adapted to be driven by a screwdriver positioned at an angle to the screw axis. Such screws are provided with cavities or undercuts within their heads which are designed to permit movement of the screwdriver tip in the head so that the screwdriver can be used at an angle to the screw axis. FIGS. 7 and 8 include an example of such a screw which is described in detail in European Patent No. 0 112 030, assigned to the assignees of the current application. This screw is moulded with a rectangular cavity in its head, below the usual screwdriver recess in the top of the screwhead and is one example of so-called angle-drive screws, of which several types are known.

I claim:

1. A securing device for securing first and second panels at right angles to each other, comprising a holding member adapted to be fitted in a recess provided in a major surface of the first panel, said holding member comprising a plug-like body portion having a front wall exposed at an edge of said first panel and positioned substantially flush therewith, said front wall having a first opening therein extending substantially perpendicular to the front wall to define a chamber in the body portion, said chamber being adapted to accommodate a securing member having a longitudinal axis within the body portion, wherein the securing member is of a type adapted to be driven by a driving member positioned at an angle to the securing member axis, the holding member also being provided with a top wall exposed at a major surface of the first panel and having a second opening therein at a relatively rearward position spaced from the front wall of the body portion by a portion of said top wall, said second opening in the top wall extending into the body portion, and connecting with said chamber for insertion of the securing member therethrough into the chamber, the chamber having a smoothly contoured lower surface substantially free from obstruction for permitting unobstructed movement of the inserted securing member to a position substantially perpendicular to the second panel with its leading end protruding through said first opening in the front wall, the top wall opening also providing access for driving the securing member to engage the second panel and draw it towards the first.

2. A securing device according to claim 1 wherein the portion of the top wall between the front wall and the top wall opening comprises at least a fifth of the length of the top wall.

3. A securing device according to claim 1 wherein the opening in the front wall is elongated in a direction perpendicular to the top wall.

4. A securing device according to claim 3 wherein the upper boundary of the elongate opening is positioned to locate the securing member so that the securing member axis intersects the plane of the front wall at a desired location when the securing device is tightened.

5. A securing device according to claim 4 wherein the elongate opening is offset so that said desired location is central relative to the front wall.

6. A securing device according to claim 1 wherein the chamber extends through the full length of the body portion and forms a third opening therein opposite the front wall, said third opening providing alternative access for insertion of the securing member in the chamber prior to positioning of the securing device in the panel recess.

7. A securing device according to claim 1 wherein the chamber is provided on its inner walls with one or more longitudinal ribs arranged to locate and retain the securing member in position in the chamber.

8. A securing device according to claim 1 wherein the opening in the top wall is provided with a chamfer at a relatively rearward edge thereof.

9. A securing device according to claim 1 wherein the securing member is a screw adapted to be driven by a screwdriver positioned at an angle to the screw axis.

10. A securing device according to claim 9 wherein the width of the opening in the front wall is smaller than the diameter of the bore of the chamber, thereby providing means by which the head of the screw is retained inside the body portion when the screw is driven.

11. A securing device for securing first and second panels at right angles to each other, said securing device adapted to be fitted in a recess provided in a major surface of the first panel, said securing device comprising:

a plug-like body portion having
(i) a front wall exposed at an edge of said first panel and positioned substantially flush therewith, said front wall having a first opening therein extending substantially perpendicular to the front wall to define a chamber in the body portion, said first opening defined at said front wall by a substantially circular top boundary wall, parallel opposite side boundary walls, and a bottom boundary wall, said chamber being adapted to accommodate a securing member having a longitudinal axis within the body portion, wherein the securing member is of a type adapted to be driven by a driving member positioned at an acute angle to the securing member axis,
(ii) a top wall exposed at a major surface of the first panel and having a second opening therein at a relatively rearward position spaced from the front wall of the body portion by a portion of said top wall, said second opening in the top wall extending into the body portion, and connecting with said chamber for insertion of the securing member therethrough into the chamber, and
(iii) a lower surface defining a bottom of said chamber, said lower surface smoothly contoured with a substantially planar first portion distant and perpendicular to said front wall and a second portion, adjacent said front wall and contiguous said first portion, sloping toward said top wall in a direction away front said first portion and toward said front wall, a distal end of said second portion contacting said front wall forming a bottom surface of said first opening, said lower surface substantially free from obstruction for permitting unobstructed movement of the inserted securing member to a position substantially perpendicular to the second panel with a leading end protruding through said first opening in the front wall, the top wall opening also providing access for driving the securing member to engage the second panel and draw it towards the first panel.

* * * * *